UNITED STATES PATENT OFFICE 2,381,082

INSECT REPELLENT

Seaphes D. Shinkle, Passaic, N. J., assignor to United States Rubber Company, New York, N. Y., a corporation of New Jersey No Drawing. Application September 29, 1943, Serial No. 504,299

6 Claims. (Cl. 167—33)

This invention relates to improvements in materials useful for repelling insects.

I have found that 4-methylquinoline-2(1)-thione, commonly known as 2-mercapto-4-methyl-quinoline, is an effective insect repellent. The term insects is used in its broad sense to include larvae, and arachnids and acarids. The structure of the compound may be represented as follows:

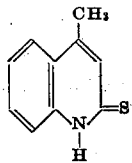

The compound and method of preparation are described by Roos in Beilstein's "Handbuch der Organischen Chemie," vol. 21, page 108 (4th edition).

The 4-methylquinoline-2(1)-thione may be applied as a dust or spray, or in solution in a suitable organic solvent or in suspension in an aqueous medium. It may be applied diluted or undiluted, or mixed with carriers, or with other insect repellents, or with insecticides, fungicides, fertilizers, buffering or safening agents. It may be applied to plants subject to attack by insects, and may be used as a component of fly sprays, and live stock sprays and dips.

The following examples are given to illustrate the invention:

Example I 1 part by weight of 4-methylquinoline-2(1)-thione in finely ground form was dispersed in 200 parts of water containing .5 part of Nacconal NR, a proprietary dispersing agent, which is a sulphonated condensation product of chlorinated kerosene with benzene. Two young bean plants one week old with the first true leaves fully expanded were sprayed with this aqueous suspension of 4-methylquinoline-2(1)-thione in an amount sufficient to wet the entire leaf surfaces. The plants were then placed in an insect cage and infested with ten Mexican bean bettle adults. Two untreated plants were infested in the same way in a separate cage. After six days it was observed that only 3 to 5% of the leaves of the treated plants has been consumed by the beetles, whereas the leaves of the untreated plants were completely skeletonized. No foliage injury due to the treatment with the 4-methylquinoline-2(1)-thione was observed.

Example II

In this case a suspension of .5 part of 4-methylquinoline-2(1)-thione in 200 parts of water was prepared as in Example I. Treated and untreated plants were infested with Mexican bean beetles, as in Example I. After ten days it was observed that only 10 to 15% of the leaves of the treated plants were consumed, whereas the leaves of the untreated plants were completely skeletonized.

Having thus described my invention, what I claim and desire to protect by Letters Patent is:

1. An insect repellent comprising an aqueous suspension of 4-methylquinoline-2(1)-thione.

2. An insect repellent comprising an aqueous suspension of 4-methtylquinoline-2(1)-thione containing a dispersing agent.

3. The method which comprises treating plants with 4-methylquinoline-2(1)-thione to repel insects therefrom.

4. The method of treating plants to repel insects therefrom which comprises spraying said plants with an aqueous suspension of 4-methylquinoline-2(1)-thione.

5. The method which comprises applying 4-methylquinoline-2(1)-thione to loci for repelling insects therefrom.

6. The method of repelling insects which comprises applying to the insect host 4-methylquinoline-2(1)-thione.

SEAPHES D. SHINKLE.